United States Patent [19]

Krickl

[11] Patent Number: 5,246,760

[45] Date of Patent: Sep. 21, 1993

[54] INSULATING ELEMENT FOR BUILDING

[76] Inventor: Ludwig Krickl, Geretsreider Strasse 10, D-W 8264 Waldkraiburg, Fed. Rep. of Germany

[21] Appl. No.: 851,076

[22] Filed: Mar. 13, 1992

[30] Foreign Application Priority Data

Mar. 13, 1991 [DE] Fed. Rep. of Germany ....... 4108110

[51] Int. Cl.$^5$ .......................... B32B 5/06; E04B 1/78; E04F 13/00
[52] U.S. Cl. ..................................... 428/113; 52/404; 52/408; 181/290; 181/294; 428/167; 428/172; 428/284; 428/300
[58] Field of Search .................. 52/404, 408; 428/113, 428/167, 172, 284, 300

[56] References Cited

U.S. PATENT DOCUMENTS 1,454,049  5/1923  Genung .............................. 428/300
3,483,601  12/1969  Smith ................................. 428/300

OTHER PUBLICATIONS

Chemical Abstracts 87(24):186042q.

Primary Examiner—James C. Cannon
Attorney, Agent, or Firm—Harness, Dickey & Pierce

[57] ABSTRACT

An insulating element for buildings and more particularly for walls, ceilings and roofs, consists of a sheep-swool fleece which is sandwiched between two layers of needled non-woven material consisting of sheep-swool. The fleece and the needled non-woven material are connected together by fibers thereof to constitute a unit able to be handled as such.

4 Claims, 1 Drawing Sheet

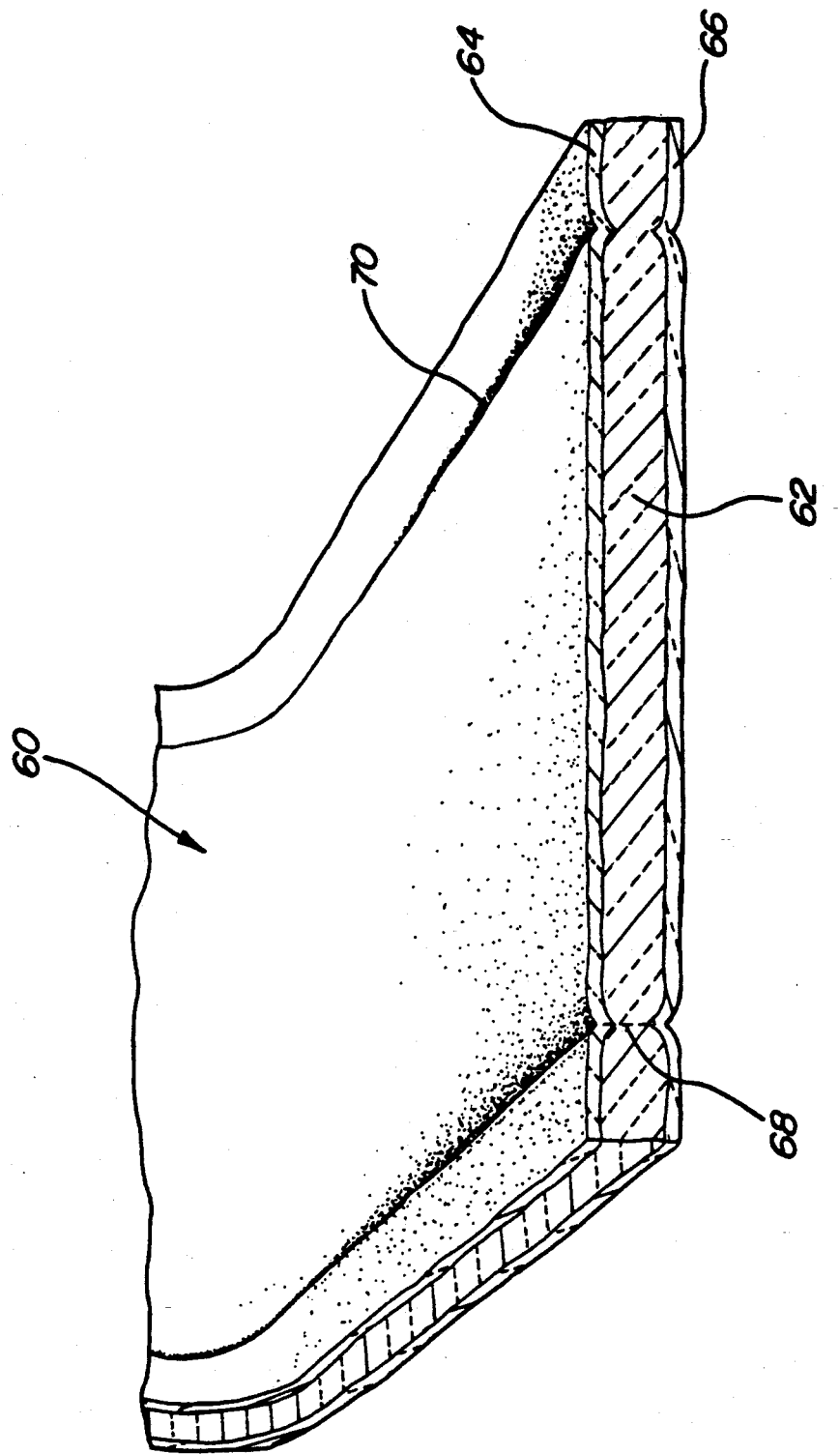

INSULATING ELEMENT FOR BUILDING

BACKGROUND OF THE INVENTION

The present invention relates to an insulating element for the thermal insulation of buildings and more particularly for the thermal insulation of the walls, ceilings and roofs thereof.

Thermal insulating materials are available in a large variety of types for buildings and underground structures, technical plant and apparatus and on the one hand serve to prevent losses of heat or cold and therefore energy losses or on the other hand to prevent the undesired effects of heat or cold as far as possible on the structure to be protected, be it for preventing damage to thermally sensitive materials or be it to prevent indirect effects of heat or cold, such as the formation of condensate.

At the present time synthetic materials such as polyurethane foam or also mineral wool and more particularly fiber glass, are utilized on a large scale as an insulating material. Such insulating materials are not only relatively expensive and involve for their production a greater or lesser quantity of energy, but furthermore their production, processing and disposal involve unavoidable impairment of the environment. It has turned out that for instance fiber glass as frequently utilized for thermal insulation of walls, ceilings and roofs of buildings decomposes in the course of time and thus looses its insulating action.

Mineral fiber materials, that is to say glass, stone or slag fiber, are generally impregnated with phenolformaldehyde. Formaldehyde and phenol cause a wide variety of complaints, more particularly in the case of allergic persons, for which reason their use in dwellings is to be avoided.

A particular problem is that fiber glass is frequently damaged by cockroaches, which are difficult to combat. There have been reports on cockroaches creeping through the fiber glass insulation of district heating systems and making their way into the buildings served thereby.

In the case of thermal insulation in dwellings the provision of uncontaminated air for the occupants is of great importance, for which reason the material used for thermal insulation should have a clean bill health, should be capable of diffusion and should be hygroscopic, that is to say capable of avoiding extremes in the moisture content of indoor air.

There is therefore a requirement for insulating elements, which while having a high insulating effect are simple and low in price and may be produced, utilized and if necessary disposed of taking environmental aspects into account and may be used while maintaining a healthy indoor atmosphere for dwellings as well, for which reason the installation is to be hygienic, capable of diffusion and hygroscopic.

A proposal has already been made to use sheepswool for this purpose as an insulating material.

It has been shown by means of experiments that the use of sheepswool is greatly superior to mineral wool as utilized on a large scale presently for the thermal insulation of buildings. Such sheepswool furthermore is available at a substantially lower price; at present black sheepswool is practically unsalable because it cannot be dyed. Sheepswool is extremely hygienic, is capable of diffusion and tempers the moisture in the atmosphere and is therefore particularly suitable to provide good clean indoor air for dwellings. From the environmental aspect as well sheepswool is one of the raw materials to which there can be no objection as regards processing, use and disposal so that there is no impairment of the environmental cycle.

As regards the aspect of fire prevention there are no objections to the use of sheepswool as an insulating material for buildings. When acted upon by a flame wool carbonizes with self-sustaining combustion so that the fire is not spread. Unlike the case synthetic insulating materials no gases with a narcotic effect are produced. A further point to be considered is that sheepswool when used as an insulating material for building dwellings can generally be completely enclosed by material which is hardly capable of burning.

For the practical use of sheepswool it is important to produce insulating elements which consist exclusively of it in order to profit from the optimum properties thereof without impairment by the inclusion of other materials and which are easy produce, simple to store and simple to ship and more particularly are easily handled during installation.

SHORT SUMMARY OF THE INVENTION

One object of the present invention is to create such an insulating element.

In order to achieve these and/or other objects appearing from the present specification, claims and drawing, an insulating element for the thermal insulation of a building and more particularly for the thermal insulation of walls, roofs and ceilings consists of a sheepswool fleece, which is sandwiched between two layers of a needled non-woven material consisting of sheepswool, the fleece and the non-woven material being joined together by means of their own fibers by needling to constitute a unit which may be handled as such.

The word "needling" is used to mean a process in which by stabbing needles into the planes of the sandwich structure transversely fibers of material are drawn from the one layer and pulled into the respective adjacent layer in order to join the layers without the use of extraneous materials.

The insulating material in accordance with the invention is particularly advantageous since the entire element consists exclusively of sheepswool with its high coefficient of thermal insulation, its self-extinguishing properties and its low flammability. In this respect a particularly high thermal insulating effect is achieved by the sheepswool fleece because it prossesses a more particularly voluminous structure. A sheepswool fleece per se however not only has a poor dimensional stability but furthermore its surface is easily damaged so that it is not easy to manipulate. It is only in the sandwiched structure of the element involving the inclusion of the sheepswool fleece between the two layers of a needled non-woven material consisting of sheepswool and the connection of these components by their own fibers using needles that there is a stable and readily handled unit.

In this respect, dependent on the purpose of use, the thickness of the insulating element may be varied by altering the thickness of the fleece.

Such insulating elements can be suitably configured for the respective application or for instance be designed with combinable rectangular dimensions with graduations in thickness for the construction of sheet-like insulating zones on the walls of buildings, ceilings or roofs. The insulating element is more particularly simple to handle, if for instance it is manufactured as a running length or a sheet able to be cut to size with a thickness corresponding to the thickness of the desired respective insulating zone and for instance warehoused in rolls with a range of graduated thicknesses.

The dimensional stability is improved in accordance with a preferred embodiment of the invention if the fleece is laid crosswise, meaning that the fleece, in which the fibers essentially have an alignment in one direction, and is so arranged in at least two superposed layers that the fiber directions of the two layer intersect each other. By needling the layers they are fixed in such position.

Preferably the connection produced by needling between the needle non-woven material and the fleece is limited to selected connection zones, which are for instance generally distributed like quilting seams so that the voluminous structure of the sheepswool fleece is preserved as far as possible.

Preferably, furthermore, the wool utilized is employed in the washed condition and moreover it is possible for the wool to be combed in order to improve its insulating effect.

Further advantageous developments and convenient forms of the invention will be gathered from the following detailed account of one embodiment thereof in conjunction with the accompanying drawings.

BRIEF DESCRIPTION OF THE DRAWING

The single FIGURE of the drawing shows an insulating element consisting of a sheepswool fleece between covers manufactured of needled non-woven material.

DETAILED ACCOUNT OF WORKING EXAMPLE OF THE INVENTION

In this respect it is a question of an insulating element 60, which is suitable for installation in any desired structure and preferably in the form of a sheet or board for use as roof insulation, which consists of a core layer 62 in the form of a horizontally cross-laid sheepswool fleece sandwiched between respective layers 64 and 66 of needled non-woven material or needled felt, also consisting of sheepswool. After arrangement of the three layers they are connected together by needling in a direction generally perpendicular to the plane of the layers to constitute a unit which may be handled as such. The needling operation means that the inherent fibers of the material are pulled inwards transversely in relation to the layers through the interfaces between the layers as is for instance diagrammatically illustrated taking the fibers 68 as an example.

In order to maintain the high volume of the fleece structure the needling operation for connecting the three layers is only performed in selected zone 70 which are generally distributed in the form of quilting seams. Their parallel arrangement in the FIGURE serves to simplify the view and however any convenient arrangement would be possible, as for instance in the form of crosses or rhombs.

Since the completed element consists exclusively of sheepswool, the particularly advantageous properties of wool are maintained and more particularly the access of air to all parts of the element and the exchange of moisture is possible.

This sandwich insulating element 60 is very firm and dimensionally stable and may also be stocked in rolls.

Preferably the wool is washed prior to processing so that the insulating action is improved as well. Furthermore, the insulating effect may be enhanced by combing.

In accordance with a preferred method of production the washed sheepswool is processed with a combing machine to give a continuous fleece sliver coming from the combing machine, which downstream from the combing machine is deposited on a belt, moving transversely in relation to the exit direction of the fleece, in such a manner that the fleece covers the breadth of this transversely extending band or belt in a zig-zag manner. The fleece may in this case be deposited of the lower layer of needled non-woven material. Dependent on the speed of the transversely extending band the result is then a "cross-laid" fleece constituting the core layer 62 of the insulating element with a varying thickness. This cross-laid fleece is placed between the layers 64 and 66 of needled non-woven material or, respectively, after the fleece has been placed on the lower layer, the upper layer is put in position and then the entire sandwiched structure is connected together by needling to constitute a single unit.

What is claimed is:

1. An insulating element for buildings comprising:
    a sheepswool fleece sandwiched between two layers of needled non-woven material consisting of sheepswool, the fleece and the needled non-woven material being connected together by fibers thereof to constitute a unit.

2. The insulating element as claimed in claim 1, wherein said fleece is cross-laid.

3. The insulating element as claimed in claim 1, wherein the connection produced by needling between the needled non-woven material and the fleece is limited to selected connection zones.

4. The insulating element as claimed in claim 3, wherein the connection zones are distributed generally in the form of quilting seams.

* * * * *

UNITED STATES PATENT AND TRADEMARK OFFICE
CERTIFICATE OF CORRECTION

PATENT NO. : 5,246,760
DATED : September 21, 1993
INVENTOR(S) : Ludwig Krickl

It is certified that error appears in the above-indentified patent and that said Letters Patent is hereby corrected as shown below:

Column 1, line 46, after "bill", insert --of--.

Column 2, line 9, "with" should be --without--.

Column 3, line 12, "layer" should be --layers--.

Signed and Sealed this

Thirty-first Day of May, 1994

Attest:

BRUCE LEHMAN

*Attesting Officer*     *Commissioner of Patents and Trademarks*